United States Patent [19]

Gross et al.

[11] 4,118,338
[45] Oct. 3, 1978

[54] METHOD FOR REGENERATING A FLUID CRACKING CATALYST

[75] Inventors: Benjamin Gross, Cherry Hill; Klaus Wilhelm Schatz, Wenonah, both of N.J.

[73] Assignee: Mobil Oil Corporation, New York, N.Y.

[21] Appl. No.: 829,845

[22] Filed: Sep. 1, 1977

[51] Int. Cl.² .................. B01J 29/38; B01J 21/20; C10G 11/18; C10G 11/04
[52] U.S. Cl. .................................. 252/417; 208/120; 208/164
[58] Field of Search ............... 252/417; 208/120, 164; 23/288 B, 288 S

[56] References Cited

U.S. PATENT DOCUMENTS

| | | | |
|---|---|---|---|
| 2,377,657 | 6/1945 | Watts | 252/417 |
| 2,383,636 | 8/1945 | Wurth | 252/417 |
| 2,526,881 | 10/1950 | Kunreuther et al. | 252/417 |
| 2,709,675 | 5/1955 | Phinney | 23/288 S |
| 3,886,060 | 5/1975 | Owen | 252/417 |

FOREIGN PATENT DOCUMENTS 2,526,839  1/1976  Fed. Rep. of Germany .......... 252/417

*Primary Examiner*—P. E. Konopka
*Attorney, Agent, or Firm*—Charles A. Huggett; Carl D. Farnsworth

[57] ABSTRACT

A hydrocarbon conversion-catalyst regeneration system is described which particularly relies upon a fluidized catalyst regeneration operation arranged to restrict the catalyst inventory of the system by employing upflowing and downflowing fluid masses of catalyst in cooperative arrangement with one another providing a limited dispersed catalyst phase section and wherein the recycle of regenerated hot catalyst admixed with spent catalyst is controlled principally as a function of the pressure differential between the upflowing and downflowing catalyst masses.

8 Claims, 1 Drawing Figure

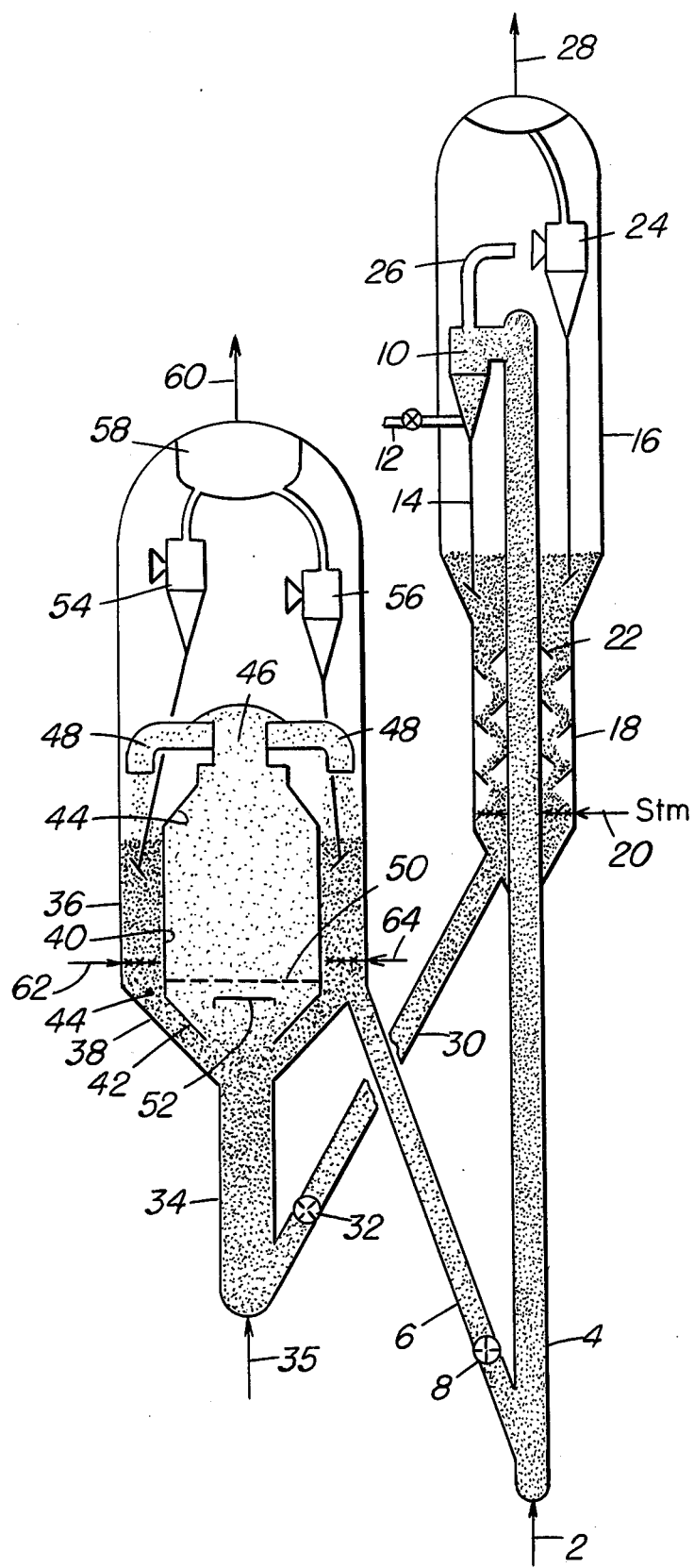

METHOD FOR REGENERATING A FLUID CRACKING CATALYST

BACKGROUND OF THE INVENTION

In recent years the design and operation of fluid cracking operations with an adjacent catalyst regeneration system has gone through some unusual design transitions with a view to improving the efficiency of the combination operation as well as the product distribution obtained from such an operation. In particular, the designs have been concerned with utilizing fluid crystalline aluminosilicate cracking catalysts in volume to oil feed ratios which minimize the catalyst inventory of the operation, improve product selectivity, and improve the recovery of available heat generated in the catalyst regeneration system. Catalyst regeneration has been improved by increasing the catalyst bed regeneration temperature by the recycle of hot regenerated catalyst thereto and by particularly promoting the combustion of CO to $CO_2$ therein by thermal and catalytic effects. That is, some recent design changes incorporate recycling of hot regenerated catalyst for admixture with cooler spent catalyst recovered from the hydrocarbon conversion operation such that the combined temperature of the mixed catalyst streams is sufficently high to rapidly initiate coke burning and accomplish catalytic CO (carbon monoxide) burning in a substantial portion of a dense fluid bed of catalyst being regenerated. It has been found in some regeneration operations that the CO concentration is the flue gas exceeds emission standards and unburned residual carbon on regenerated catalyst becomes undesirably high; that is, above about 0.05%. Several design parameters and apparatus arrangements have been proposed to solve this problem. However, these designs often suffer from a number of problems such as high catalyst inventory, low temperature, incompletely regenerated catalyst, a lack of operating flexibility to control catalyst recycle or employ external apparatus configurations or arrangements in an effort to effect more suitable control in the operation, thereby contributing to operating costs.

On the other hand, some regenerator vessel designs and arrangements have been substantially increased in height, thereby increasing construction costs. In these arrangements, the circulating catalyst inventory and necessary catalyst bed hold-ups have increased and high temperature metallurgy requirements have increased. These factors contribute to increased material, maintenance and operating costs of the units.

The present invention is concerned with yet another design and operating arrangement for improving operating flexibility and reducing the catalyst inventory of the regeneration system. More significant, however, is the arrangement of apparatus for reducing the regenerator apparatus size for a given oil feed through-put without a loss of operating flexibility. Other advantages of the improved apparatus arrangement of this invention and method of operating will be more apparent from the following discussion.

SUMMARY OF THE INVENTION

The present invention relates to an improved method and arrangement of apparatus for effecting the regeneration of catalyst employed in a fluid catalytic cracking operation. More particularly, the present invention is concerned with an improved fluid catalyst regenerator apparatus arrangement of restricted height and catalyst inventory which operates to provide a significant increase in operating flexibility. With the improved arrangement and system of this invention, a more uniform as well as more efficient removal by burning of deposited carbonaceous material is obtained. Furthermore, the conversion of formed CO to $CO_2$ is particularly effected in the burning operation.

The regenerator apparatus of this invention comprises a cylindrical chamber generally restricted in size to house an upflowing fluid mass of catalyst which is surrounded by a larger diameter vessel of sufficient diameter to provide an annular second space housing a mass of downflowing catalyst in the annular space or chamber about said cylindrical chamber. The annular second space or chamber houses a second substantially more dense fluid mass of downflowing catalyst particles than housed in said upflowing cylindrical chamber which is in open communication in a bottom portion thereof with a bottom opening in said cylindrical chamber. The communication between is essentially unrestricted except by the width of the annular section. A first vertically extending riser conduit means is in open communication at the top thereof with the bottom opening of said annular chamber and the bottom opening of said cylindrical chamber to provide for transferring a suspension of catalyst particles upwardly through said riser conduit into the bottom of said cylindrical chamber and in admixture with catalyst particles passed from the bottom opening of said annular chamber into the bottom opening of said cylindrical chamber. A horizontally placed small circular baffle means is placed in a bottom portion of said cylindrical chamber in coaxial alignment with said bottom opening thereto and spaced vertically apart therefrom and the discharge open end of said first riser conduit to aid with distributing the catalyst suspension across the lower cross-sectional area of the cylindrical chamber. A perforated distributor grid may be placed across a bottom portion of said cylindrical chamber above said circular baffle means or in lieu thereof to further distribute the upflowing suspension of catalyst in regeneration gas as discussed below.

A fluid mass of upflowing catalyst particles of relatively high particle concentration undergoing regeneration by burning deposited carbonaceous material on the catalyst particles and formed carbon monoxide as a result of said burning in the presence of oxygen containing gas is maintained in a substantial and major vertical portion of the cylindrical chamber. A gas stream such as a relatively inert gas, air or an oxygen supplemented gas stream or a mixture thereof is relied upon for passing spent catalyst particles as a suspension upwardly through a first riser conduit means and into the bottom open end of said cylindrical chamber. If desired, one may also mix hot regenerated catalyst particles with the spent catalyst before entering the first riser conduit. All of the oxygen containing regeneration gas required in the regenerator may be added at the bottom of the first riser, or a portion of all of the regeneration gas may be added to a lower bottom portion of the more dense upflowing fluid mass of catalyst maintained within said cylindrical chamber. In one arrangement, an inert gas may lift the catalyst comprising spent catalyst as a suspension through the first riser and first come in contact with oxygen containing regeneration gas after admixture with recycled regenerated catalyst from the annular section in a bottom portion of said cylindrical chamber. It is preferred to employ oxygen containing regeneration gas as the lift gas. The horizontal perforated grid means in a bottom portion of the cylindrical chamber may be used alone or in conjunction with the baffle means above identified. The perforated grid means for distributing the suspension may comprise an air distributing grid for introducing oxygen containing regeneration gas.

In any of these regeneration gas inlet arrangements, the volume of gas and velocity relied upon will be sufficient to maintain an upflowing suspension providing a concentration of catalyst particles within the range of 10 to 40 lbs. per cubic foot and more usually less than 35 lbs. per cubic foot.

The top of the cylinder chamber is capped by an inverted conical member housing a volume restricted dispersed catalyst phase section above the more dense upflowing fluid suspension of catalyst. A relatively short cylindrical section extends above said conical member and is of sufficient length to accommodate a plurality of radially extending inverted "U" shaped arm means, open on the bottom side thereof for changing the direction of flow of the suspension and promoting the separation of entrained hot regenerated catalyst particles from gaseous combustion products. The outer ends of said radiating arms curve or extend downwardly and are in open communication at their extreme end with said annular chamber section about said cylindrical chamber. The short cylindrical section is capped at its upper end above the radiating arm means.

A relatively dense, downwardly moving fluid bed of catalyst particles of high particle concentration than said upflowing mass of catalyst is maintained in said annular chamber section and in an amount sufficient to develop a catalyst pressure head therein to effect recycle of catalyst particles as desired from the bottom opening of said annular chamber into the bottom opening of said cylindrical chamber. Thus, the amount of catalyst recycled from the annular section to the cylindrical chamber and/or admixed with the spent catalyst suspension discharged from the first riser conduit is controlled as a function of the pressure differential between the upflowing and downflowing catalyst masses, i.e., the developed catalyst pressure head by the dense fluid bed of catalyst in the annular chamber above that in the upflowing catalyst mass. The head of pressure developed by the catalyst in the annular section may be controlled substantially by the volume of catalyst in the annular section and/or by the amount of gaseous material introduced to a lower portion of the annular bed of catalyst for passage upwardly there-through. Thus, the more the annular catalyst bed is fluffed or fluidized with fluidizing gas the less pressure head it will develop. The gaseous material introduced to the lower portion of the annular bed may be a regeneration gas such as air to effect a second high temperature burning of any residual carbon of catalyst or an inert gas for fluffing and/or stripping the catalyst may be employed. In either arrangement, the volume of gas introduced may be used to control the pressure head developed by the annular bed of catalyst.

The apparatus arrangement above described differs from known prior art apparatus arrangements in that a cylindrical vessel is sized to house primarily an upflowing fluid mass of catalyst particles providing a concentration of catalyst particles within the range of 40 to 5 pounds per cubic foot. A relatively dispersed catalyst phase of limited duration will be maintained in the restricted upper portion before entering the disengaging arms. This upflowing catalyst mass is surrounded by an annular bed of partially or completely regenerated hot catalyst particles maintained in downflowing fluid condition at a temperature within the range of 1250° to about 1600° F. More usually, the upper temperature is not above about 1450° F. The catalyst temperatures developed during regeneration in the cylindrical, upflowing fluid mass of catalyst particles are controlled in substantial measure as a function of regeneration gas flow rate, the amount of combustibles to be burned, the pressure head of catalyst developed in the annular catalyst bed in conjunction with the temperature of that annular catalyst mass and the amount of catalyst recycled to the bottom open inlet of the cylindrical chamber. The recirculation of catalyst from the downwardly flowing dense annular catalyst phase to the upflowing less dense catalyst mass can be varied from a small fraction (<0.5) to a high multiple of the catalyst flow (>10). Thus, the upflowing cylindrical fluid catalyst mass can be maintained at a relatively high superficial gas velocity (>5 ft/sec)since high rates of entrainment can be accommodated with separation and return of catalyst through the annulus to the upflowing bed. This system for effecting fluidized catalyst regeneration has greatly increased regeneration efficiency due to better mixing and more uniform temperatures in the catalyst mass. Preheating of regeneration air and addition of a combustible fuel in addition to carbonaceous deposits on the catalyst may be also be relied upon to exercise some effect on the regeneration temperatures achieved in the system.

The vessel means forming and extending above the annular and cylindircal chamber sections of the regenerator vessel is sized to house a plurality of cyclonic separating means comprising two or more sequentially arranged cyclones whereby catalyst particles entrained with gaseous material recovered from the annular section and the cylindrical section are separated and return by cyclone diplegs to the annular bed of catalyst therebelow.

The hydrocarbon conversion side of the apparatus combination comprises one or more riser conversion reactors to which hot regenerated catalyst is supplied from the annular regenerator section above described. An oil charge, such as a gas oil or other high boiling material to be cracked is charged to the riser with or without a gasiform diluent material. The diluent material may be light gaseous hydrocarbon comprising $C_5$ and lighter materials or it may be a relatively inert material such as steam. The diluent may be mixed with the oil charge before contact with the catalyst or it may be used to initially lift the catalyst up a portion of the riser conversion zone before contact with oil. The regenerated catalyst is mixed with the oil feed to be converted under conditions to form a suspension of an elevated temperature of at least 900° F. and more usually a temperature within the range of 1000° F. to about 1150° F. Preheating of the hydrocarbon charge up to about 800° F. in combination with multiple nozzle feed inlet means across the riser cross-section to obtain a more completely dispersed catalyst-oil suspension and mix temperature may also be employed.

The suspension formed in the riser is passed upwardly through the riser at a velocity providing a hydrocarbon residence time within the range of 1 to 20 seconds, more usually within the range of 4 to 10 seconds and more usually less than about 8 seconds depending on the characteristics of the oil charge to be cracked and temperature employed. Over-cracking of the charge is to be avoided particularly when desiring gasoline boiling product. The suspension following traverse of the riser cracker is discharged directly into one or more separator means connected generally radially to the discharge end of the riser. The separator means relied upon for separating the catalyst hydrocarbon suspension is desirably similar to or the same as that covered in copending application Ser. No. 728,100, filed Sept. 30, 1976, or application Ser. No. 742,806, filed Nov. 18, 1976. On the other hand, the cyclone separator of application Ser. No. 662,187, filed Feb. 27, 1976, now allowed and comprising stripping means in a lower section of the cyclonic separator may be employed. The disclosures of the above-identified application are incorporated herein by reference thereto. The cyclonic-stripping separation combination is particularly desirable to minimize undesired over-cracking of desired product at the elevated cracking temperatures employed since it permits a greater control on the time the hydrocarbons are in contact with catalyst particles at the elevated temperatures. Rapid separation of at least a major portion of the catalyst from hydrocarbon product of cracking upon discharge from the riser is most important in order to preserve the selectivity of the catalyst employed under the operating conditions of the cracking operation.

The upper end of the hydrocarbon conversion riser with attached primary separating means, such as the preferred cyclonic separating means, is housed in a large cylindrical vessel of larger diameter in an upper portion thereof than in a lower portion thereof. The upper portion of this relatively large cylindrical vessel provides space for housing additional secondary cyclonic separating means for the further separation and recovery of catalyst fines from hydrocarbon vapors.

Catalyst particles separated from hydrocarbon vapors as above described are passed downwardly into and through a lower stripping section comprising the smaller diameter portion of the vessel wherein the catalyst is counter-currently contacted with additional stripping gas to further remove entrained hydrocarbons from the catalyst. The stripping zone may be a separate cylindrical chamber of suitable diameter or an annular section as shown in the drawing. The temperature of the stripping zone is usually at least 900° F. and may be as high as 1000° or 1150° F. Generally, it is 50° to 100° below the inlet cracking temperature. Thus, a stripping gas such as steam or other suitable relatively inert stripping gas should be at an elevated high temperature to minimize reducing the temperature of the discharged and separated catalyst before contact with oxygen containing gas in the regeneration zone.

In a time restricted regeneration mode, particularly desired in modern refinery operations, combustion of carbonaceous material with oxygen containing gas is desirably initiated at a temperature of at least about 1100° F. and more preferably the initial temperature is at least about 1175° F. However, in the two stage fluid catalyst mass regneration arrangement of this invention, regeneration of the catalyst may be initiated in at least the initial regenerator riser section at a lower temperature of about 1000° F. without significantly upsetting the catalyst regeneration sequence of this invention. On the other hand, the combustion of carbon monoxide is particularly promoted at a temperature of 1200° F. It is desirable in the operating modes of this invention to preheat the regeneration air initially brought in contact with the spent catalyst. This may be accomplished with an in-line burner means known in the prior art. In any of the catalyst regeneration arrangements above identified, it is important to particularly promote the combustion of carbon monoxide formed in an atmosphere permitting the recovery of heat thus generated by the catalyst.

The apparatus configuration and method of operation of this invention is novel in several respects as herein discussed. The combination of apparatus is useful for cracking various hydrocarbon fractions including straight run gasoline and higher boiling materials such as atmospheric and vacuum gas oils, recycle oils, residuals, shale oils, solvent refined coal, and tar sands extraction products, to produce products of improved octane rating. It is particularly useful for cracking gas oils and higher boiling hydrocarbon fractions such as recycle and residual oils, vacuum gas oils, wide boiling range crude oils, and hydrogenated resids to obtain desired products.

The catalysts which may be employed with advantage in the apparatus combination of this invention include amorphous and crystalline silica-alumina catalytic material and mixtures thereof. The crystalline silica-alumina materials may be of a relatively large pore size such as one may obtain by using faujasite crystalline zeolites, mordenite and other known materials disclosed in the prior art. The catalyst may be a mixture of large and smaller pore crystalline zeolites such as disclosed in U.S. Pat. No. 3,748,251. On the other hand, the catalyst employed may be one of the catalyst disclosed in U.S. Pat. No. 3,886,060.

The drawing is a diagrammatic sketch in elevation of one arrangement of apparatus for effecting the catalytic conversion of hydrocarbons with the improved apparatus arrangement for regenerating catalyst particles obtained from said hydrocarbon conversion operation.

Referring now to the drawing by way of example, a hydrocarbon oil feed such as gas oil or higher boiling material is introduced by conduit 2 to the bottom of riser reactor 4. Hot regenerated catalyst is also introduced to the bottom of riser 4 by standpipe 6 containing flow control valve 8. A vapor-liquid suspension is formed in the lower portion of riser 4 at an elevated temperature above about 950° F. and more usually above about 980° F. Suspension temperatures within the range of 980° to 1200° F. and at least 1000° F. are not unusual depending on the hydrocarbon conversion desired and the composition of the hydrocarbon material charged to the riser. The suspension formed in the riser base portion is passed through the riser under selected temperature and residence time conditions. A hydrocarbon residence time within the range of 2 to 15 seconds and more usually within the range of 5 to 10 seconds is desirable before the suspension passes through suitable separating means, such as cyclonic separating means or other means rapidly effecting separation of catalyst particles from vaporous hydrocarbon conversion products. Thus, in the arrangement of the drawing, the suspension is discharged from riser 4 into one or more cyclonic separators attached to the end of the riser and represented by separator means 10. Catalyst particles separated in cyclone 10 pass in contact with stripping gas introduced by conduit 12 to a lower portion of the cyclone. Catalyst thus contacted and separated is withdrawn by dipleg 14 for discharge into a bed of catalyst there-below.

The upper end of riser 4 with attached separator means 10 as shown or another suitable arrangement herein identified is housed in a larger vessel means 16 herein referred to as a receiving and catalyst collecting vessel. The lower portion of vessel 16 is generally of smaller diameter and comprises a catalyst stripping section 18 to which a suitable stripping gas, such as steam, is introduced to a lower portion thereof as by conduit 20. The stripping section is provided with a plurality of baffle means 22 over which the downflowing catalyst passes counter-current to upflowing stripping gas.

Cyclonic separating means 24 is provided for recovering stripping hydrocarbon products and stripping gas from entrained catalyst particles. There may also be a second sequential stage of catalyst separation for product vapors discharged from cyclone 10 by conduit 26. Hydrocarbon products and stripping gas separated from the catalyst is withdrawn by suitable conduit means communicating with a plenum chamber and withdrawal conduit 28.

Stripped catalyst comprising carbonaceous deposits of the riser conversion is withdrawn from the bottom of the stripping section at an elevated temperature by standpipe or conduit 30 containing flow control valve 32. The stripped catalyst is passed from standpipe 30 into the bottom portion of regenerator riser 34. A lift gas is also introduced to the bottom of riser 34 by conduit 35. The lift gas is selected from one of preheated air, hot flue gas or oxygen supplemented flue gas. The lift gas is in an amount forming a suspension with the catalyst which is caused to move upwardly through the riser 34 under incipient or partial regeneration conditions and into the bottom portion of an enlarged regenerator vessel 36. Regenerator vessel 36 comprises a bottom closure member 38 shown in the drawing to be conical in shape. Other suitable shapes may also be employed such as half rounded or a less rounded dish shape may also be employed.

Regenerator vessel 36 comprises in a lower portion thereof, a smaller diameter cylindrical vessel means 40 provided with a conical bottom containing a concentric opening in the bottom thereof, the bottom opening having a cross-section at least equivalent to the cross-section of the riser 34. Chamber 40 comprising a cylindrical section above conical bottom 42 is spaced vertically above and apart from the bottom 38 of vessel 36 sufficient to form an annular space 44 of substantial cross-sectional area. Vessel 40 is provided with a generally conical head member 46 terminating in a relatively short cylindrical section of sufficient vertical height and capped at its upper end by means 47 to accommodate a plurality of radiating arm means 48. The radiating arm means 48 are open in the bottom side thereof since they are "U" shape channels in cross-section and operate to discharge a concentrated stream of catalyst substantially separated from combustion product gases generally downward into the annulus 44. Vessel 40 is referred to herein as the combustor vessel since in this portion of the regenerator, the combustion of carbonaceous material and formed carbon monoxide is particularly promoted. A distributor grid 50 may be used in the lower cross-section of vessel 40 above conical bottom 42 to facilitate distribution of the suspension passed upwardly into the combustor. Inverted circular cup plate 52 may also be used if desired to accomplish the distribution of the suspension as mentioned above. Thus, grid 50 may be used alone or in combination with plate 52.

In the upper portion of vessel 36, a plurality of cyclonic separator means 54 and 56 are provided for separating combustion flue gases from entrained catalyst particles. The separated flue gases pass into plenum 58 for withdrawal by conduit 60. In the event that significant combustion of carbon monoxide takes place in the upper portion of vessel 36 and above bed 44, it is proposed to carry heat absorbing catalyst into said dispersed phase to improve the heat recovery efficiency of the operation.

The regenerator apparatus above defined and shown in the drawing and explained method of operation maintains during operation a substantial mass or bed of fluid regenerated catalyst particles in the annular zone. Fluidizing gas which may or may not contain oxygen to achieve complete combustion of carbon combustibles is introduced to the lower portion of the annular zone or segments of the annular zone by conduits 62 and 64. By segments, it is intended to mean that only selected vertical portions of the annular section beneath the discharge of radiating arms 48 will contain regenerated catalyst. Thus, in this embodiment, the volume of regenerated catalyst retained in the annulus can be considerably reduced over that retained by using the total annulus. On the other hand, sufficient regenerated catalyst must be retained by the annulus to permit the method of operation herein defined.

The catalyst regeneration operation of this invention is intended to provide regenerated catalyst at an elevated temperature above 1200° F. and particularly within the range of 1300° to 1500° F. having residual coke on catalyst less than about 0.15 and more usually within the range of 0.01 to 0.05 weight percent. The unique catalyst regeneration operation of this invention is accomplished by passing spent catalyst as a suspension preferably in oxygen containing gas upwardly through a riser mixing zone and thence into the primary combustion zone. Regenerated catalyst at an elevated temperature of at least 1200° F. is recycled by the catalyst pressure head developed in the annulus for admixture with the spent catalyst passing from the riser 34 into the combustion section. Hot regenerated catalyst may also be mixed with spent catalyst passed to the base of riser 34. The recycle of regenerated catalyst for admixture with spent catalyst is essentially self-controlling once certain operating flow characteristics are established such as the catalyst flow rate to the hydrocarbon conversion zone, catalyst make-up rate to the operation and the flow rate of the suspension passing upwardly through riser 34 and combustion section 40 of the regenerator. Thus, the suspension of catalyst being subjected to regenerating condition passes through gradations of catalyst particle concentration or density per given volume within the range of about 35 pounds per cubic foot down to about 10 pounds per cubic foot. Thus, in the combustion section 40 it is not necessary to maintain a dense fluid bed of catalyst with a significant interface between a more dispersed phase of catalyst there-above. On the other hand, the upflowing mass of catalyst may be maintained relatively uniform in particle concentration until encountering the conical head section and radiating discharge arms which will accelerate the suspension and thus reduce the particle concentration per given volume.

The downflowing mass of regenerated catalyst collected in the annulus of the regenerator at an elevated temperature above 1200° F. up to about 1500° F. may be contacted with additional oxygen containing gas should further combustion of carbon deposits be required. This downflowing mass of catalyst will normally comprise a concentration of catalyst particles in excess of 35 pounds per cubic foot and sufficient to assure flow from the annulus into the upflowing suspension entering the combustor. Regenerated catalyst collected in the annulus or a section of the annulus is withdrawn by standpipe 6 for passage to the riser hydrocarbon conversion zone 4. It has been mentioned above that regenerated catalyst may also be mixed with the spent catalyst in standpipe 30 or it may be separately added to the lower bottom portion of riser 34. Also, it is contemplated adding additional oxygen containing regeneration gas to an upper portion of riser 34 or in a lower portion of combustor 40 to facilitate the mixing of regenerated catalyst with spent catalyst and promote the combustion of carbon containing combustible materials.

The catalyst regeneration system of this invention contemplates providing the catalyst with a carbon monoxide oxidation promoter in an amount particularly promoting the combustion of formed carbon monoxide within the region of high particle concentration in the combustor. Catalyst particularly suitable for this purpose include chromium and platinum in selected small amounts suitable for the purpose as well as other materials known and disclosed in the prior art. The oxidation promoter may be added as separate discrete catalyst particles or it may be added to the cracking catalyst employed in the operation. Substantially any suitable cracking catalyst may be employed in the system of this invention whether it is primarily an amorphous catalyst, a crystalline aluminosilicate catalyst or a mixture thereof. The method and apparatus of this invention is particularly suitable for using high and lower activity, relatively low coke producing crystalline zeolite cracking catalysts comprising faujasite crystalline zeolite and others known in the prior art in a regeneration arrangement particularly promoting the recovery of available heat generated by the burning of carbonaceous deposits of hydrocarbon conversion.

Having thus generally described the method and apparatus of this invention and described specific embodiments in support thereof, it is to be understood that no undue restrictions are to be imposed by reason thereof except as defined by the following claims.

We claim:

1. In a hydrocarbon conversion-catalyst regeneration operation employing fluidized catalyst particles comprising a crystalline zeolite wherein catalyst particles comprising carbonaceous deposits are recovered from hydrocarbon conversion and passed to a catalyst regeneration operation to remove carbonaceous deposits by burning thereby heating the catalyst particles to an elevated temperature within the range of 1200° F. to 1500° F. and catalyst particles thus heated are returned to the hydrocarbon conversion operation, the improved method for regenerating the catalyst particles which comprises, forming a suspension of spent catalyst particles comprising carbonaceous deposits in upflowing gaseous material passing upwardly through a first riser zone communicating with the bottom open end of a larger diameter cylindrical combustion zone for burning carbonaceous material, recovering regenerated catalyst in an annular zone about said cylindrical zone, passing regenerated catalyst from the bottom of said annular zone in admixture with said catalyst suspension adjacent the upper end of said first riser zone and before passage into the bottom open end of said larger diameter cylindrical combustion zone, passing a mass of regenerated catalyst particles in admixture with spent catalyst upwardly through said combustion zone under conditions supporting combustion of carbon containing material thereby heating said catalyst particles to a temperature above 1200° F., separating catalyst particles thus regenerated from gaseous combustion products following upward flow through said larger diameter combustion zone, recovering hot regenerated catalyst thus separated in said annular zone, and maintaining a catalyst head of pressure between said annular zone and said cylindrical zone to maintain a flow of hot regenerated catalyst from said annular zone into the bottom open end of said larger diameter cylindrical zone to form a mix temperature with carbon containing catalyst particles suspended in oxygen containing gas sufficient to particularly promote the combustion of carbon material in the presence of oxygen containing regeneration gas.

2. The method of claim 1 wherein an oxygen containing regeneration gas is used to form said suspension in said first riser zone.

3. The method of claim 1 wherein oxygen containing regeneration gas is introduced to lower portion of said combustion zone.

4. The method of claim 1 wherein burning of residual carbon on catalyst particles is accomplished in said annular zone.

5. The method of claim 1 wherein the combustion of formed carbon monoxide is promoted particularly in said combustion zone.

6. The method of claim 1 wherein regenerated catalyst is mixed with catalyst containing carbonaceous deposits passed to said first riser zone.

7. The method of claim 1 wherein combustion of carbonaceous material is initiated in said first riser zone.

8. The method of claim 1 wherein a suspension of hot combustion products and regenerated catalyst particles is discharged from the upper end of said combustion zone generally downward into said annular zone.

* * * * *